United States Patent [19]
Guest

[11] Patent Number: 6,056,326
[45] Date of Patent: May 2, 2000

[54] TUBE COUPLINGS

[76] Inventor: John Derek Guest, "Iona", Cannon Hill Way, Bray, Maidenhead, Berkshire SL6 2EX, United Kingdom

[21] Appl. No.: 09/276,586

[22] Filed: Mar. 25, 1999

[30]    Foreign Application Priority Data

Mar. 27, 1998 [GB]    United Kingdom ................... 9806642

[51] Int. Cl.[7] ...................................................... F16L 17/02
[52] U.S. Cl. .............................. 285/81; 285/93; 285/322; 285/323; 285/314

[56]    References Cited

U.S. PATENT DOCUMENTS

| | | | |
|---|---|---|---|
| 3,653,689 | 4/1972 | Sapy et al. ............................... | 285/308 |
| 3,909,046 | 9/1975 | Legris ..................................... | 285/308 |
| 4,005,883 | 2/1977 | Guest ...................................... | 285/322 |
| 4,169,572 | 10/1979 | Simon ..................................... | 285/81 |
| 4,606,783 | 8/1986 | Guest ...................................... | 156/73.1 |
| 4,613,158 | 9/1986 | Ekman ..................................... | 285/323 |
| 4,637,636 | 1/1987 | Guest ...................................... | 285/323 |
| 5,580,105 | 12/1996 | Miller, Jr. et al. ....................... | 285/322 |

FOREIGN PATENT DOCUMENTS

| | | | |
|---|---|---|---|
| 558844 | 9/1993 | European Pat. Off. ............... | 285/323 |
| 562999 | 9/1993 | European Pat. Off. ............... | 285/323 |
| 2413750 | 11/1974 | Germany ................................ | 285/323 |
| 40-4175595 | 6/1992 | Japan ..................................... | 285/323 |
| 40-4296291 | 10/1992 | Japan ..................................... | 285/81 |

*Primary Examiner*—Eric K. Nicholoson
*Attorney, Agent, or Firm*—Baker & Daniels

[57]    ABSTRACT

A tube coupling is provided with a coupling body having a throughway opened at one end to receive an end portion of a tube. The coupling body has an internal cam surface tapering towards its open end in which a collet is located for locking the tube in the coupling body by engagement with the tapered cam surface, and also has stop means to limit entry of the collet into the throughway. The coupling body includes a main body, the main body including the throughway to receive the end portion of the tube and including the stop means to limit insertion of the collet. The coupling body also includes a cap in screw-threaded engagement with the main body, the cap including the open end to the throughway and the tapered cam surface. First indexing means on the cap and second indexing means on the main body are moveable relative to one another and engage one another in first and second positions to provide resistance to movement through the first and second positions. In the first position, a tube may be inserted and, by depressing the collet into the coupling body, the tube may be released from the coupling body. In the second position, the collet is engaged with the stop means to prevent the collet from being depressed into the coupling body to release the tube.

8 Claims, 10 Drawing Sheets

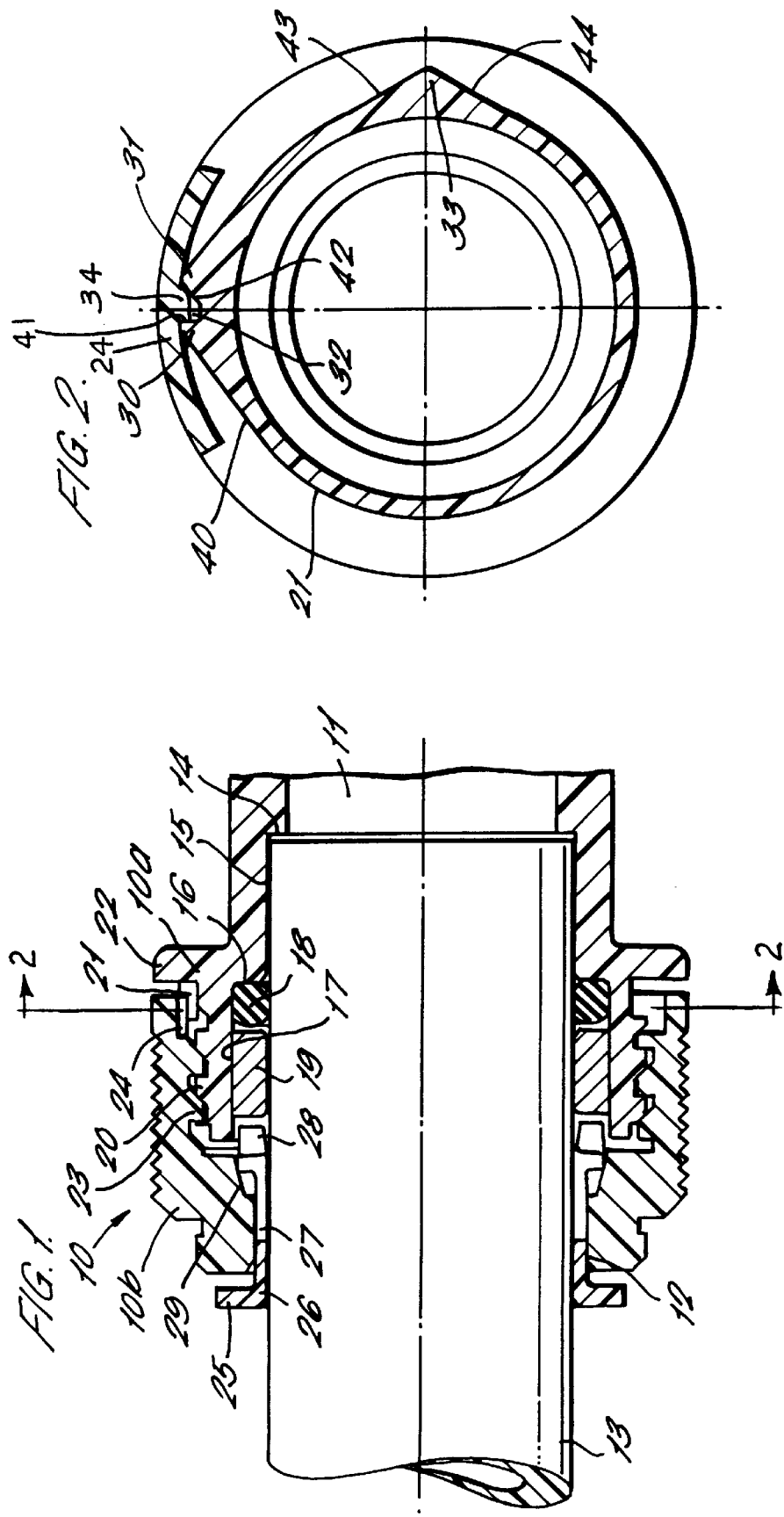

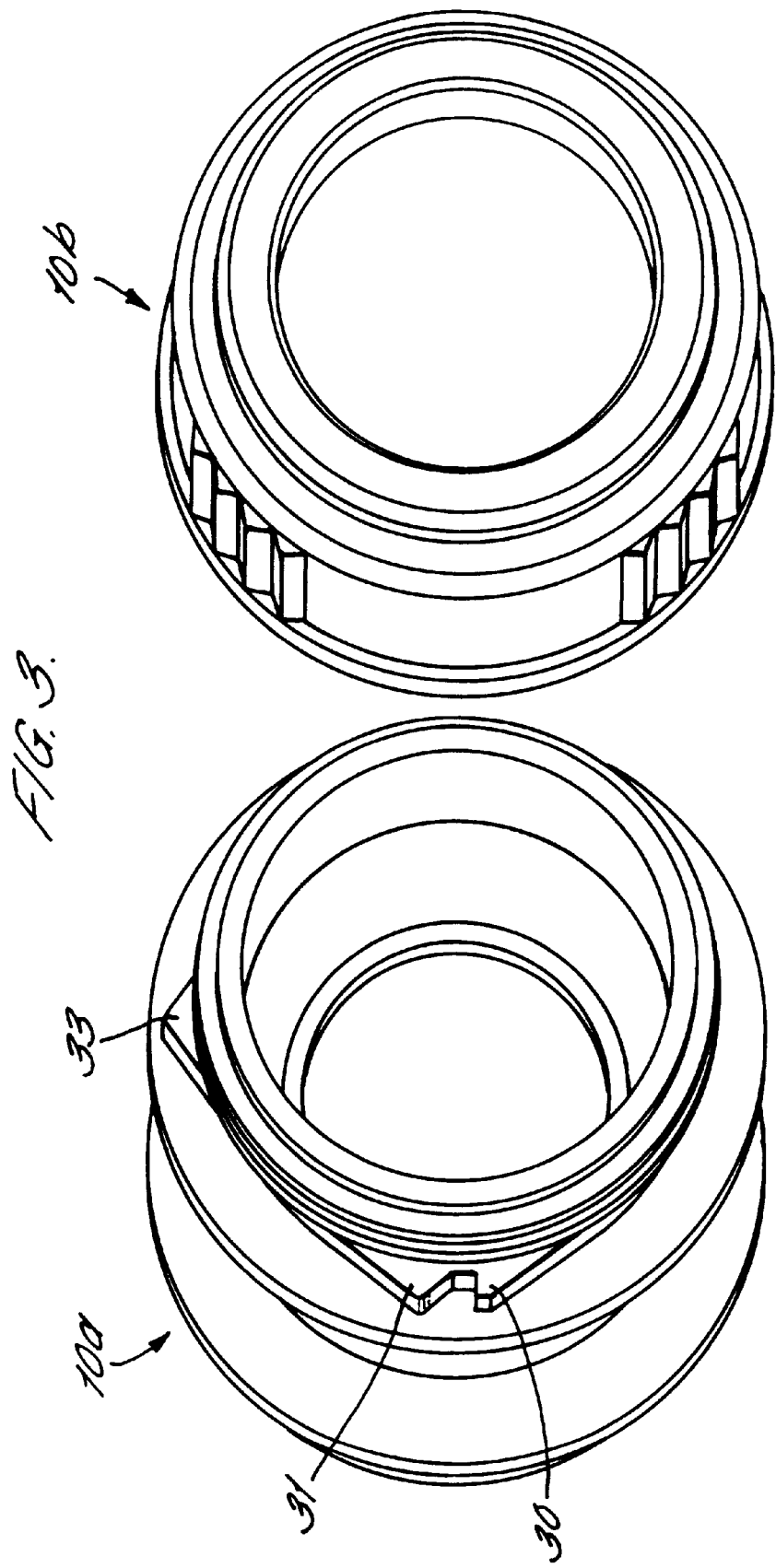

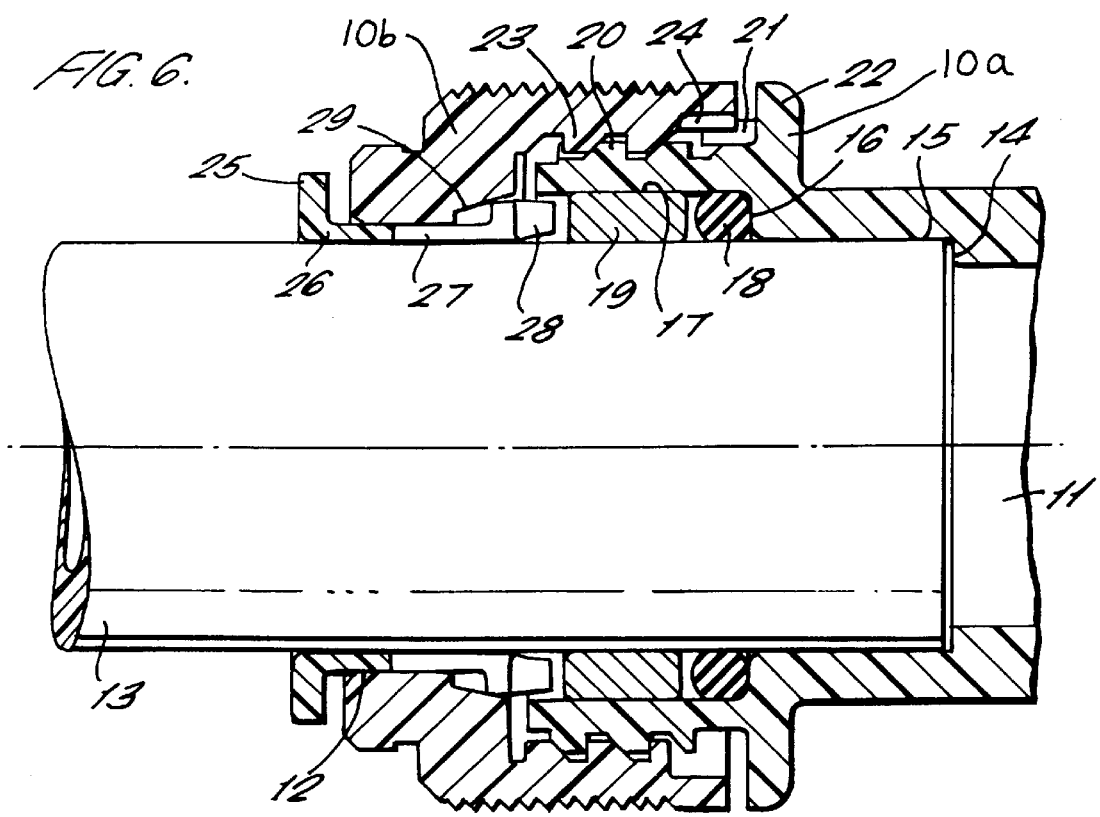
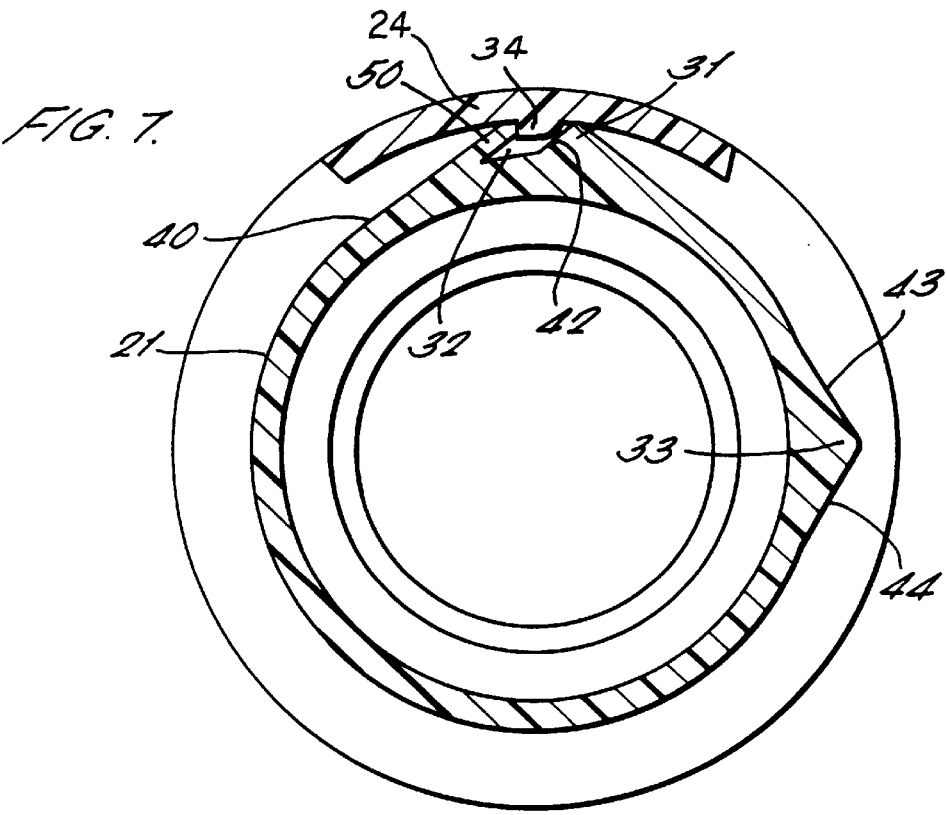

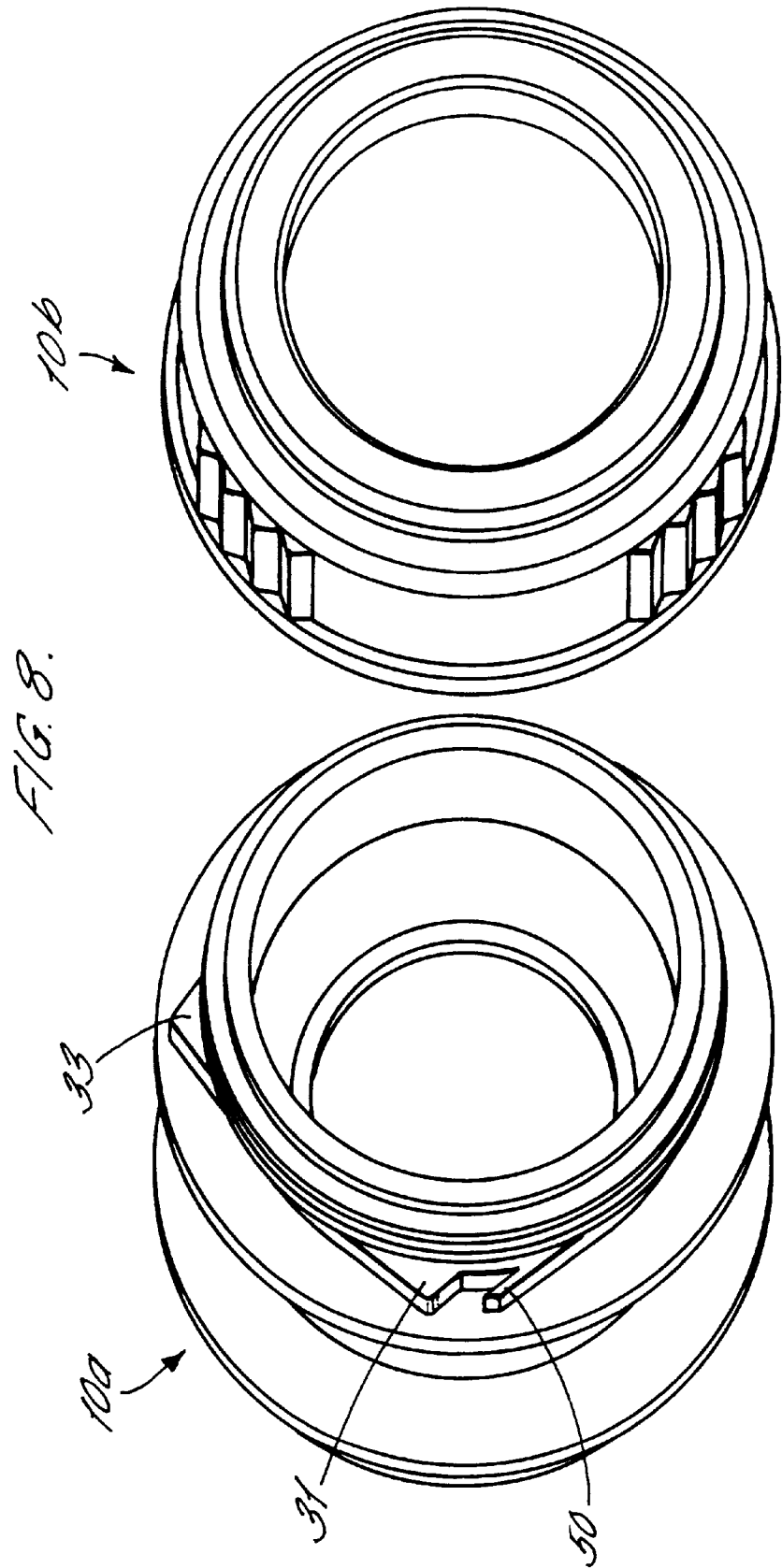

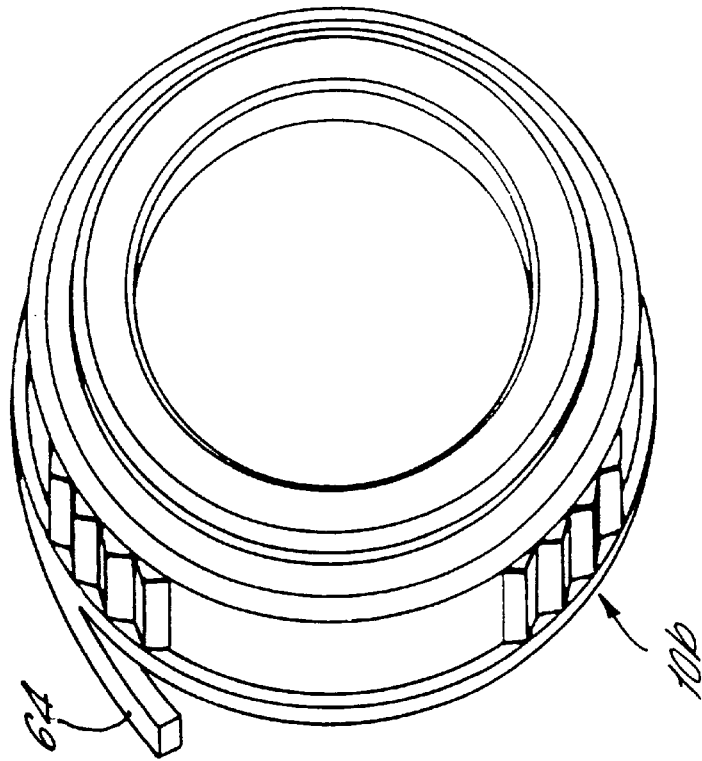
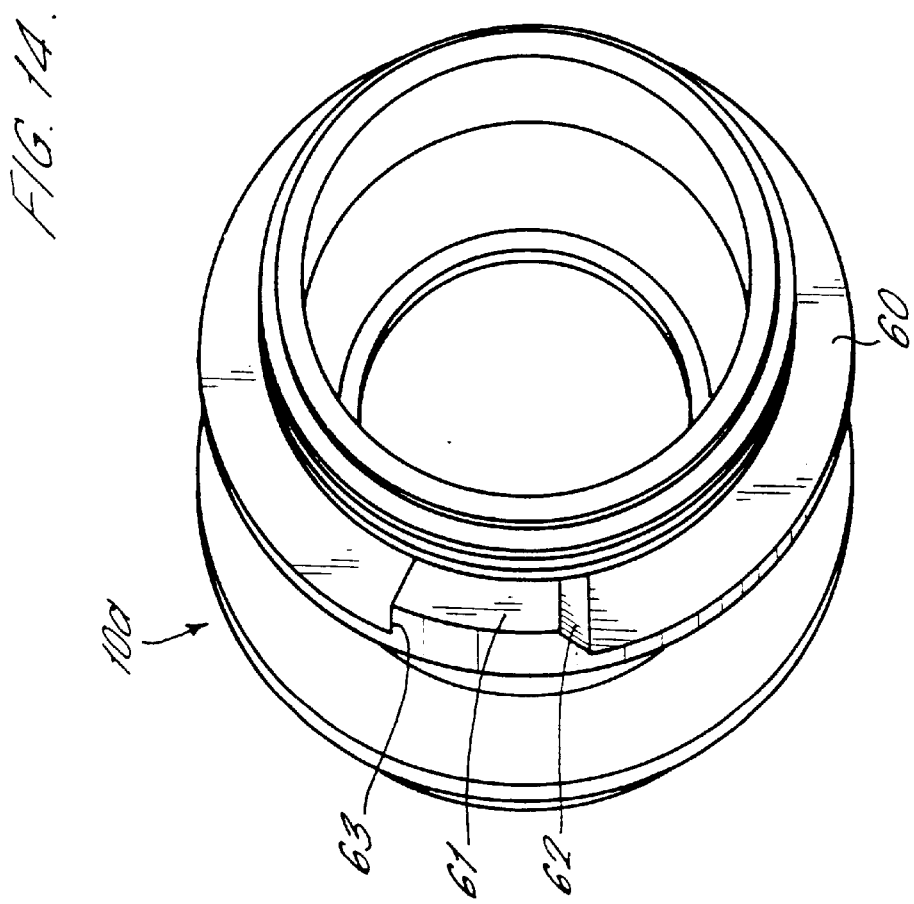
FIG. 14.

TUBE COUPLINGS

BACKGROUND OF THE INVENTION

1. Field of the Invention

This invention relates to tube couplings.

2. Background Prior Art

My "Speedfit" tube connector (UK Patent No. 1520742 and others) has a coupling body with a throughway open at one end and a tapered cam surface in the open end to receive a collet for locking a tube in the coupling. The collet is compressed against the tube by a slight withdraw of the tube and collet from the coupling body which locks the tube in the coupling body. The collet can be depressed into the body to release the tube.

My "SuperSeal" design (UK Patent No. 2167147) has a separate sleeve screwed into the open end of the coupling body in which the tapered cam is formed. By screwing the sleeve into the coupling body the gripping action of the collet on the tube is increased. Also the collet becomes locked up in the coupling body and cannot be depressed to release the tube.

SUMMARY OF THE INVENTION

An object of the present invention is to provide a tube coupling which can readily be adjusted manually between one state in which a tube can be locked in and released from the coupling body and a second state in which a tube is locked first and cannot be released.

The invention provides a tube coupling comprising a coupling body having a throughway open at one end to receive an end portion of a tube and having an internal cam surface tapering towards the open end in which a collet is located for locking the tube in the coupling body by engagement with the tapered cam surface, and having stop means to limit entry of the collet into the throughway, the coupling body having a main body the throughway of which receives the end of a tube and contains said stop means to limit insertion of the collet and an end cap in screwthreaded engagement with the main body containing said open end to the throughway and the tapered cam surface, and indexing means between the end cap and main body to define different positions of rotational adjustment in the first of which a tube can be inserted and, by depressing the collet into the coupling body, released from the coupling body and in the second of which the collet is engaged with the stop means to prevent the collet being depressed into the coupling body to release the tube.

Preferably the end cap has an internally threaded sleeve portion encircling and in screwthreaded engagement with an external thread on the main body.

In the latter case said indexing means may be provided between the mouth of the sleeve and a portion of the main body beyond said threaded portion.

More specifically the indexing means may comprise a radially inwardly directed projection at the mouth of the sleeve and a plurality of cam means disposed around the main body beyond the screwthreaded to define said first and second positions of rotational adjustment of the cap with respect to the sleeve.

In one particular arrangement according to the invention the first cam means on the main body may have an inclined cam face engaged by the projection on the sleeve to provide an increasing resistance to relative rotation when the projection encounters the cam in screwing the body parts together and may have a radial face beyond the inclined face with which the projection is engageable to resist unscrewing of the cap from the main body.

Furthermore a second cam means may be located on said main body adjacent the first cam means to provide a recess to receive said projection on the sleeve to define said one position of rotation of adjustment of the body parts.

Preferably the second cam means has an inclined face opposite the first cam means to lift the projection on the sleeve part over the second cam means as the cap is screwed further onto the main body together towards said second position of the cap/main body.

In addition third cam means may be provided on the main body having an inclined face on the side adjacent the first step means to provide a resistance for the projection to define the said second position relative rotation of the body parts.

BRIEF DESCRIPTION OF THE DRAWINGS

The following is a description of some specific embodiments of the invention, reference being made to the accompanying drawings, in which:

FIG. 1 is a cross-sectional view of a tube coupling in accordance with the invention including a tube inserted in the coupling;

FIG. 2 is a sectional view through the coupling of FIG. 1 along the line II—II;

FIG. 3 is a perspective view of the two parts of the coupling body of the coupling of FIG. 1.

FIGS. 6 to 10 are similar views of FIGS. 1 to showing a first modified arrangement;

FIGS. 12 and 13, 14 and 15 show further modified arrangements.

DESCRIPTION OF THE PREFERRED EMBODIMENTS

Figure 5:
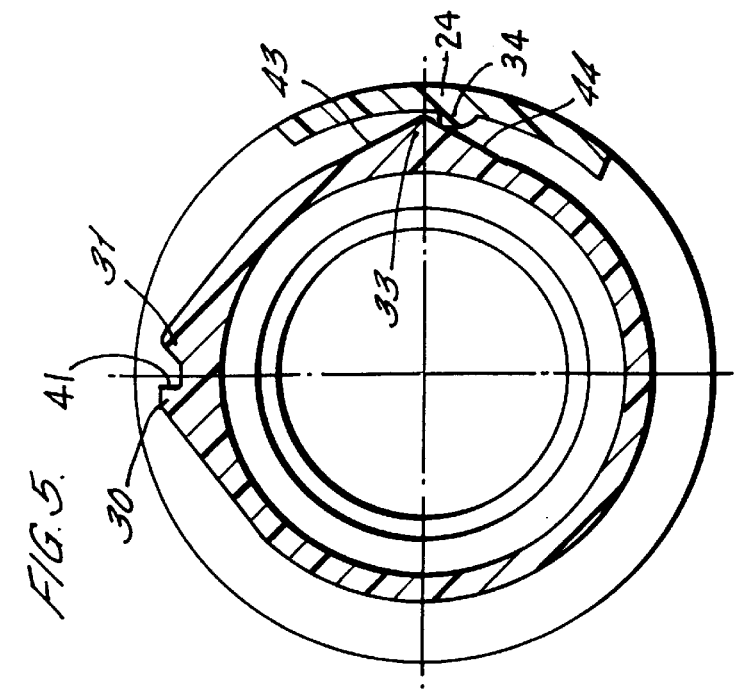
FIGS. 4 and 5 are similar views to FIGS. 3 and 1 showing the coupling in a second locking condition.

Referring firstly to FIG. 1 of the drawings, there is shown a tube coupling body indicated generally by reference numeral 10 having a throughway 11 open at one end 12 to receive an end portion of a tube 13. The coupling body comprises a main body 10a and a cap 10b screwed onto the main body as described below.

At a location spaced from the open end, the throughway in the main body has a first increase in diameter at a step 14 to provide an enlarged bore 15 in which the end of the tube 13 is a close sliding fit with the end of the tubing engaging the step 14. The throughway has a further increase in diameter at a step 16 to form an enlarged bore 17 in which an 'O' ring seal 18 is located against the step followed by a spacer washer or compression ring 19.

The main body 10a of the coupling has an external screw-threaded section 20 extending from the end of the body part followed by a cam section indicated at 21 followed in turn by an encircling radial flange 22. The cap 10b of the coupling body encircles the main body and has an internal screw-threaded section 23 which mates with the screwthread 20 on the main body. The open end of the cap has a cam section 24 which cooperates with the cam section 21 on the main body as described later.

A collet indicated at 25 is mounted in the open end of the coupling body comprising an annular member 26 and resilient arms 27 projecting from the annular member into the throughway of the coupling body and terminating in heads 28. The heads of the collet engage in a tapered cam surface 29 converging towards the end of the coupling body to be compressed against the tube 13 by engagement of the heads with the cam surface to lock the tube in the coupling body.

In the position shown in FIG. 1, the cap 10a is partially screwed onto the main body 10b and there is a gap between the heads 28 of the collet and the spacer washer 19 in the main body of the coupling which allows the collet to be depressed into the coupling body for release of the tube.

Referring now to FIG. 2 of the drawings, the cam section 21 of the main body between the thread 20 and the flange 22 is formed with first and second cams 30 and 312 located close together with a gap 32 between the cams. A further, third cam 33 is position at 90° around the main body from the first and second cams. The cams are engaged by an abutment 34 on the inside of the enlarged end of the cap to define two different rotational positions of the cap with respect to the main body.

The cam 30 has a shallow incline 40 with which the projection 34 is engageable as the cap is screwed onto the main body. On the other side of the cam there is a radial face 41 which forms an end stop engageable with the projection 34 to resist reverse movement of the cap. If the cap is forced and the abutment 34 is damaged, that will be evident and indicate misuse of the fitting.

Spaced opposite the face 41 of the cam 30 is the second cam 31 which has an inclined face 42 adjacent face 41 over which projection 34 can ride when the cap is rotated further from said first position.

Figure 4:
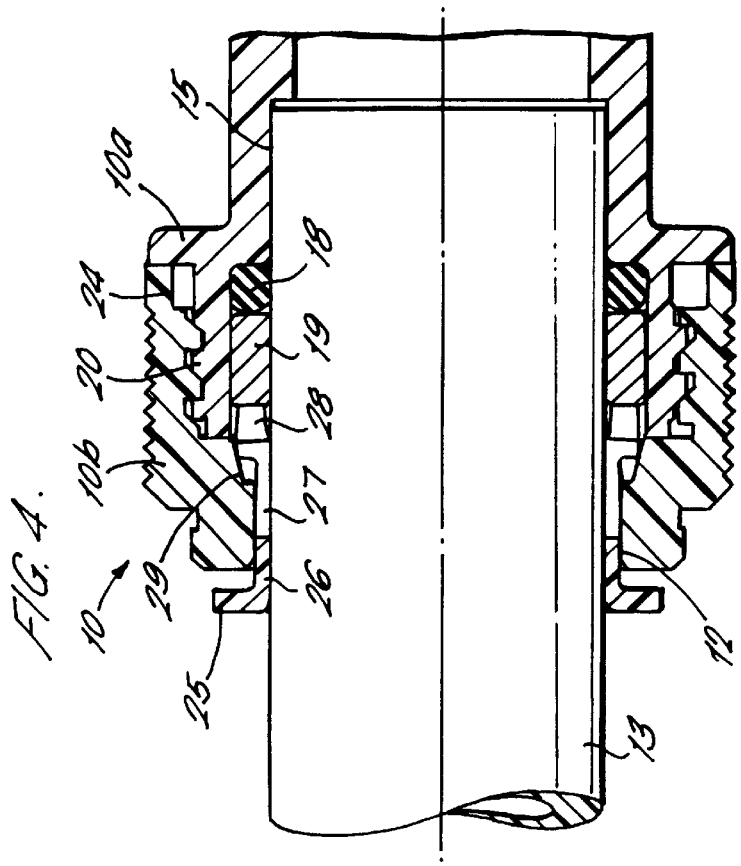
Figure 9:
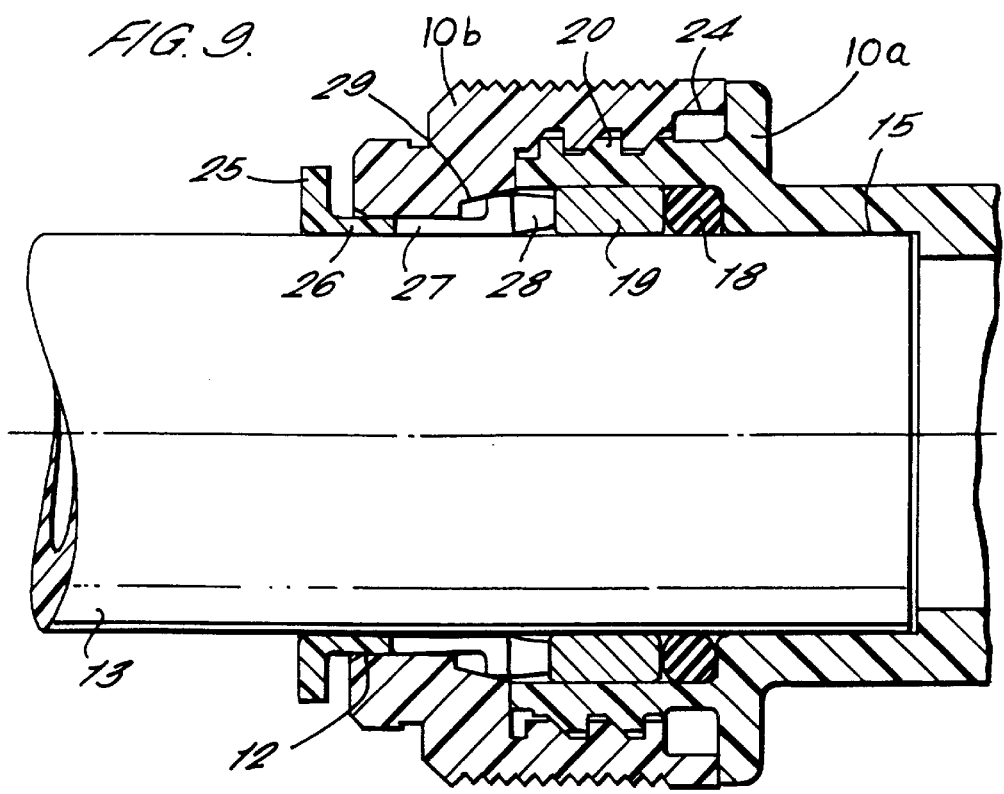
Figure 10:
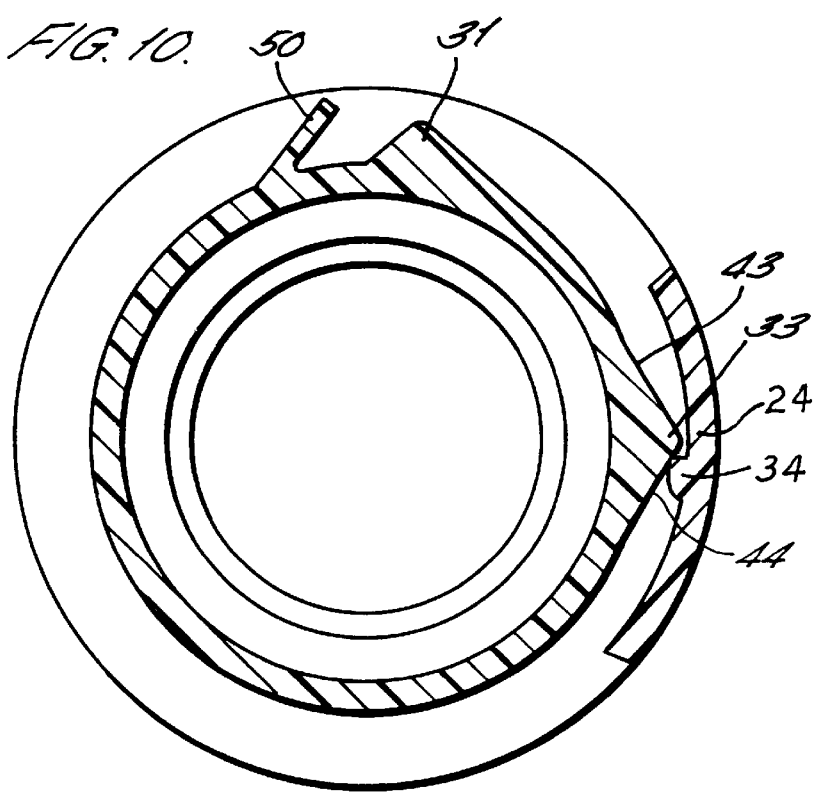
Figure 11:
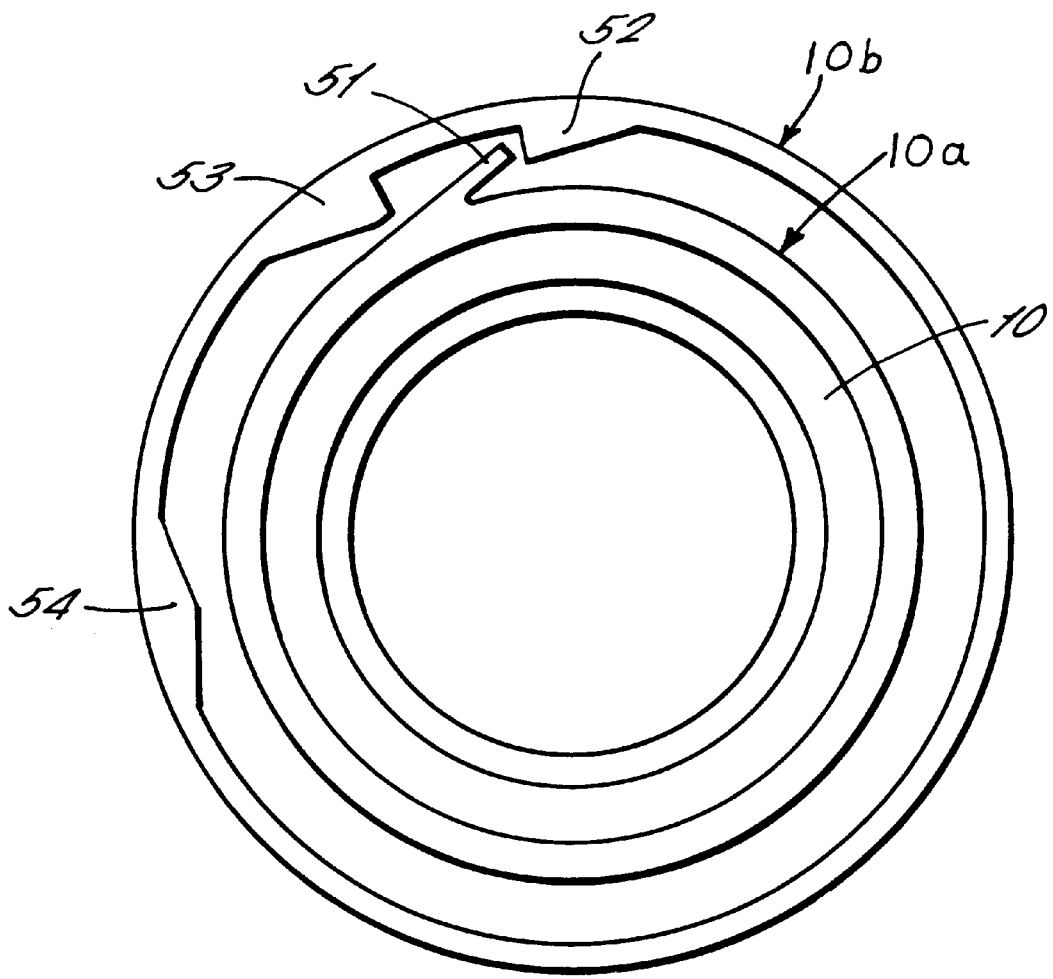
FIG. 11 shows a second modified arrangement.

The cam 33 has angled ramps 43 and 44 on either side thereof. As the cap is rotated towards a quarter of a turn from the first position, the projection 34 engages the first ramp 43 which provides a resistance to further movement as the projection rides up over the cam. When the projection rides just over the peak of the cam, the end of the cap engages the flange 22 as shown in FIG. 4. In this position the collet is drawn into the mouth of the main body of the coupling to close up the gap between the collet arms and spacer washer and to firmly clamp the arms of the collet against the tube 13. In this position the collet cannot be depressed into the coupling body to release the tube as will be apparent from FIG. 4.

When it is required to release the tube from the coupling body, the cap is rotated back through a quarter turn until the projection of the cap engages between the first and second cams on the main body and then the collet can be depressed into the coupling body to release the tube.

The function of the cams will best be appreciated from the following description, of events from assembling the cap onto the body to releasing the cap from the "SuperSeal" position.

The assembly operator assembles the cap onto the body. The clockwise face of cam 31 offers little resistance and the operator stops rotating the cap once the clockwise face of cam 32 provides resistance.

The cap is now in the "Speedfit" condition, and will remain here until the customer/end user wants to change this.

The counter-clockwise face of the cam 30 precludes easy removal of the cap from the body. In fact this face will be damaged if the cap is removed thereby providing evidence of tampering.

If the user decides to adjust the fitting he/she turns the cap past the nominal resistance of the clockwise face of cam 31 and continues to rotate the cap through a quarter turn past the slight interference of the clockwise face of cam 33.

The cap has now compressed the collet, spacer washer and 'O' ring together—thereby creating extra grip and sealing as a "SuperSeal" connection. In addition, any free play in the tube connection is removed and the collet cannot be released accidentally.

To release the fitting, the user must first turn the cap counter-clockwise past cam 33 and the slight interference afforded by the counter-clockwise face of cam 31, and hence back to the "Speedfit" position. The tube can now be removed by releasing the collet in the usual way provided by the "Speedfit" coupling.

Referring now to a first modified arrangement shown in FIGS. 6 to 11, the first cam 30 on the main body is replaced by an obliquely angled flexible leg 50 performing the same function as the solid cam 30. The solid cam 31 and 33 may also be replaced by obliquely angled flexible legs. The arrangement is otherwise the same as that of FIGS. 1 to 5 and operates in the same way.

Figure 12:
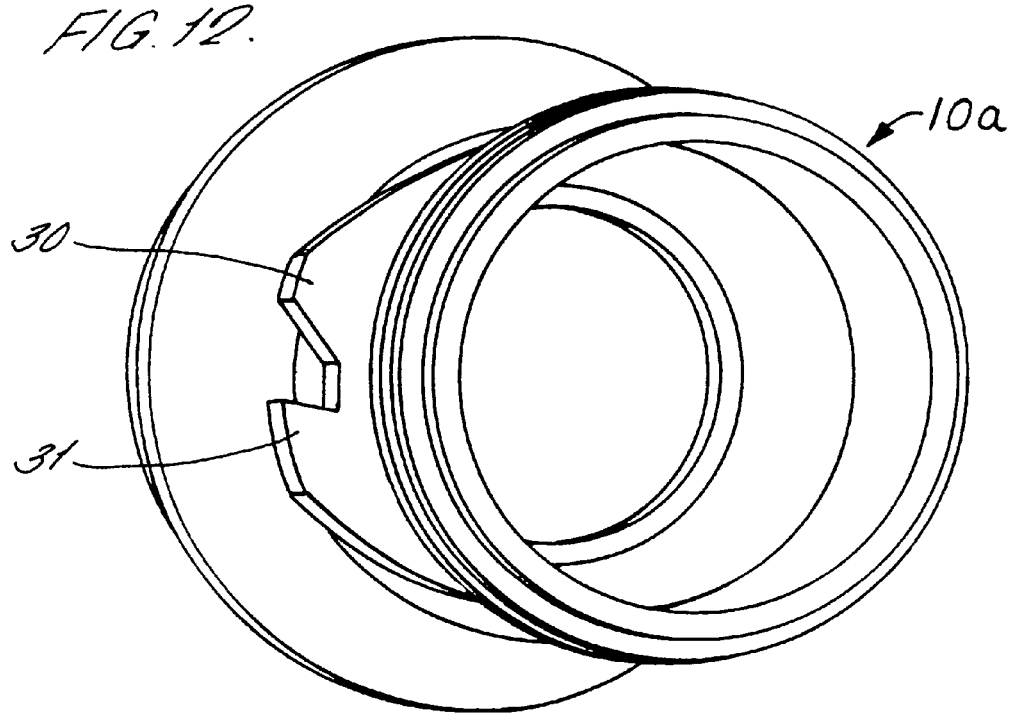

The arrangement shown in FIG. 12 is a further modification in which the positions of the cams on the body and cap are reversed. On the tube coupling body, a single obliquely angled leg 51 is formed which could, equally, be a cam of the form 24 provided on the cap of the arrangements of FIGS. 1 to 5. The cap is formed with a pair of closely spaced cams 52, 53 equivalent to cams 30 and 31 of the arrangement of FIGS. 1 to 5 and a further circumferentially spaced cam 54 equivalent to cam 33 on the body of arrangement FIGS. 1 to 5. The arrangement of cams on the cap and resilient leg on the coupling body will define first and second positions of rotation of the cap with respect to the coupling body as previously described.

Figure 13:
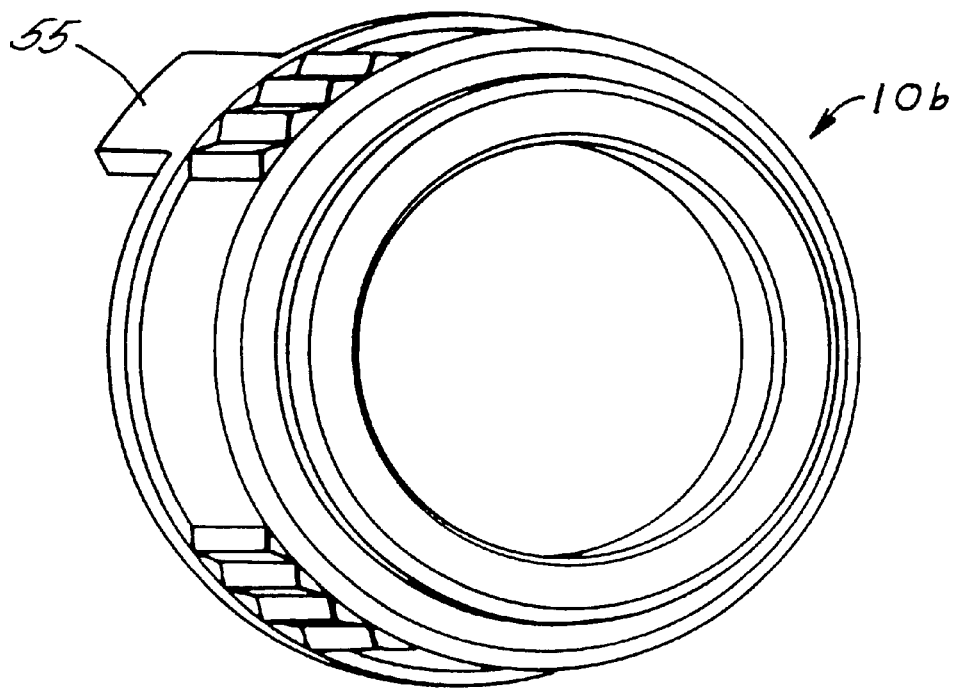

FIGS. 12 and 13 show a further arrangement in which the cams 30, 31 and 33 (not shown) on the body are engaged by an axially extending flexible leg 55 on the cap to define first and second positions of rotation of the cap on the coupling body as before.

FIG. 14 shows a further variant in which the coupling body is formed with a flange 60 having raised cams 61 (only one of which can be seen) having a shallow angle ramp 62 at one end and a perpendicular face 63 at the other end. A resilient leg 64 on the cap is engageable with the cams riding up over the ramp and cam with clockwise rotation of the cap and dropping down to the flange 60 beyond face 63 to resist return movement. A similar cam is provided at a spaced location around the flange to provide a second position in which the cap is located with respect to the coupling body.

Figure 15:
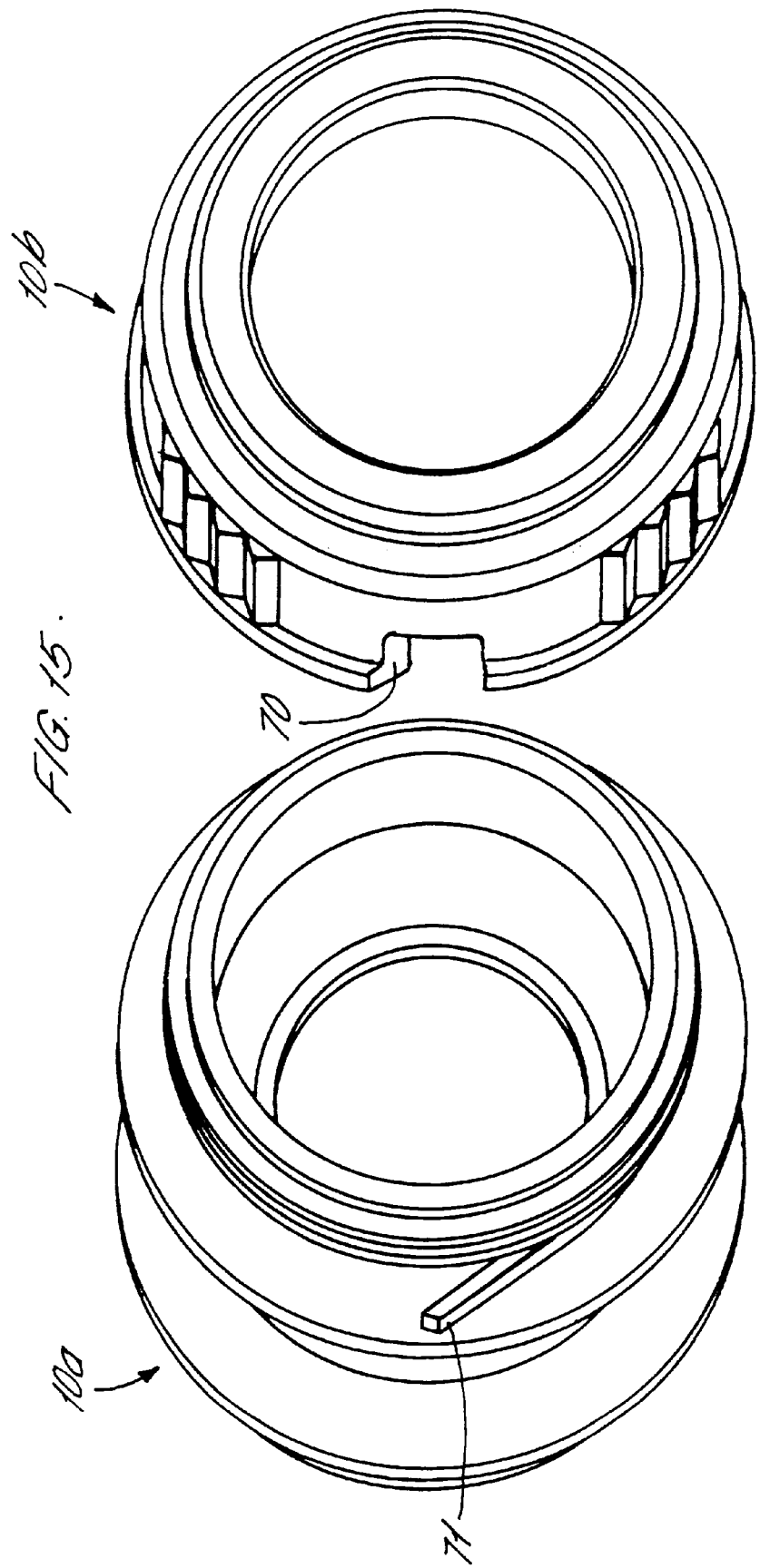

FIG. 15 shows yet a further arrangement in which the cap has windows 70 (only one of which can be seen) spaced around the cap and with which an outwardly angled flexible leg 71 on the coupling body is engageable to define the two spaced positions of rotation of the cap with respect to the body.

What is claimed is:

1. A tube coupling comprising:
   a coupling body having a throughway open at one end to receive an end portion of a tube, and having an internal cam surface tapering towards said open end in which a collet is located for locking said tube in the coupling body by engagement with said tapered cam surface, and having stop means to limit entry of said collet into said throughway, said coupling body having a main body, said main body including said throughway to receive said end portion of the tube and including said stop means to limit insertion of said collet, said coupling body having a cap in screw-threaded engagement with said main body, said cap including said open end to said throughway and said tapered cam surface; and first indexing means on said cap and second indexing means on said main body, said first and second indexing means moveable relative to one another and engaging one another in first and second positions to provide resistance to movement through said first and second positions, whereby in said first position a tube may be inserted and, by depressing said collet into said coupling body, said tube may be released from said coupling body, and in said second position said collet is engaged with said stop means to prevent said collet from being depressed into said coupling body to release said tube.

2. The tube coupling of claim 1, wherein said cap includes an internally threaded sleeve portion, said sleeve portion having a mouth, and said main body includes an externally threaded portion, said sleeve portion encircling and in screw-threaded engagement with said externally threaded portion.

3. The tube coupling of claim 2, wherein said main body includes a portion adjacent said threaded portion, said first and second indexing means provided between said mouth and said portion of said main body adjacent said threaded portion.

4. The tube coupling of claim 3, wherein said first indexing means is disposed on said mouth, said first indexing means comprising one of a projection and a plurality of cams; and said second indexing means is disposed on said portion of said main body adjacent said threaded portion, said second indexing means comprising the other of said projection and said plurality of cams.

5. The tube coupling of claim 4, wherein said plurality of cams includes a first cam, said first cam having an inclined face engaged by said projection to provide an increasing resistance to relative rotation when said projection engages said first cam in screwing said cap on said main body, and said first cam having a radial face opposite said inclined face, said radial face engageable with said projection to resist unscrewing said cap from said main body.

6. The tube coupling of claim 5, wherein said plurality of cams includes a second cam, said second cam disposed adjacent said first cam to provide a recess between said first cam and said second cam, said recess to receive said projection to define said first position.

7. The tube coupling of claim 6, wherein said second cam includes an inclined face adjacent said first cam, said inclined face to lift said projection over said second cam as said cap is screwed further onto said main body towards said second position.

8. The tube coupling of claim 7, wherein said plurality of cams includes a third cam, said third cam having an inclined face adjacent said second cam, said inclined face to lift said projection over said third cam as said cap is screwed further onto said main body to define said second position.

* * * * *